United States Patent
Babel et al.

(12)

(10) Patent No.: US 6,549,855 B2
(45) Date of Patent: Apr. 15, 2003

(54) MEASURING DEVICE FOR EVALUATION OF PHYSICAL AND/OR CHEMICAL PROPERTIES OF GASES, FLUIDS AND/OR SOLID MATERIALS

(75) Inventors: Wolfgang Babel, Weil der Stadt (DE); Detlev Wittmer, Maulbronn (DE)

(73) Assignee: Endress & Hauser Conducta Gesellschaft fur Mess-und Regeltechnik mbH & Co., Gerlingen (DE)

( * ) Notice: Subject to any disclaimer, the term of this patent is extended or adjusted under 35 U.S.C. 154(b) by 0 days.

(21) Appl. No.: 09/783,464

(22) Filed: Feb. 14, 2001

(65) Prior Publication Data
US 2002/0032532 A1 Mar. 14, 2002

(30) Foreign Application Priority Data
Feb. 15, 2000 (DE) .......................... 100 06 755

(51) Int. Cl.[7] .............................................. G01N 21/00
(52) U.S. Cl. ........................ 702/22; 702/121; 700/266
(58) Field of Search ........................... 702/22, 31, 121; 700/266, 267; 703/12; 707/103 R, 103 Y, 103, 103 Z; 73/1–2

(56) References Cited

U.S. PATENT DOCUMENTS 5,299,141 A * 3/1994 Hungerford et al. .......... 702/49
6,285,964 B1 * 9/2001 Babel et al. ................. 702/121

* cited by examiner

*Primary Examiner*—Kamini Shah
(74) *Attorney, Agent, or Firm*—Young & Basile, PC

(57) ABSTRACT

A measuring device for the evaluation of the physical and/or chemical properties of gases, fluids and/or solid materials. The measuring device is equipped with an arithmetic-logic unit which is linked to a sensor at a technical facility. The arithmetic-logic unit and the sensor are linked to each other over a communications medium. The arithmetic-logic unit and equipment at the technical facility are linked by means of an additional communications medium.

20 Claims, 1 Drawing Sheet

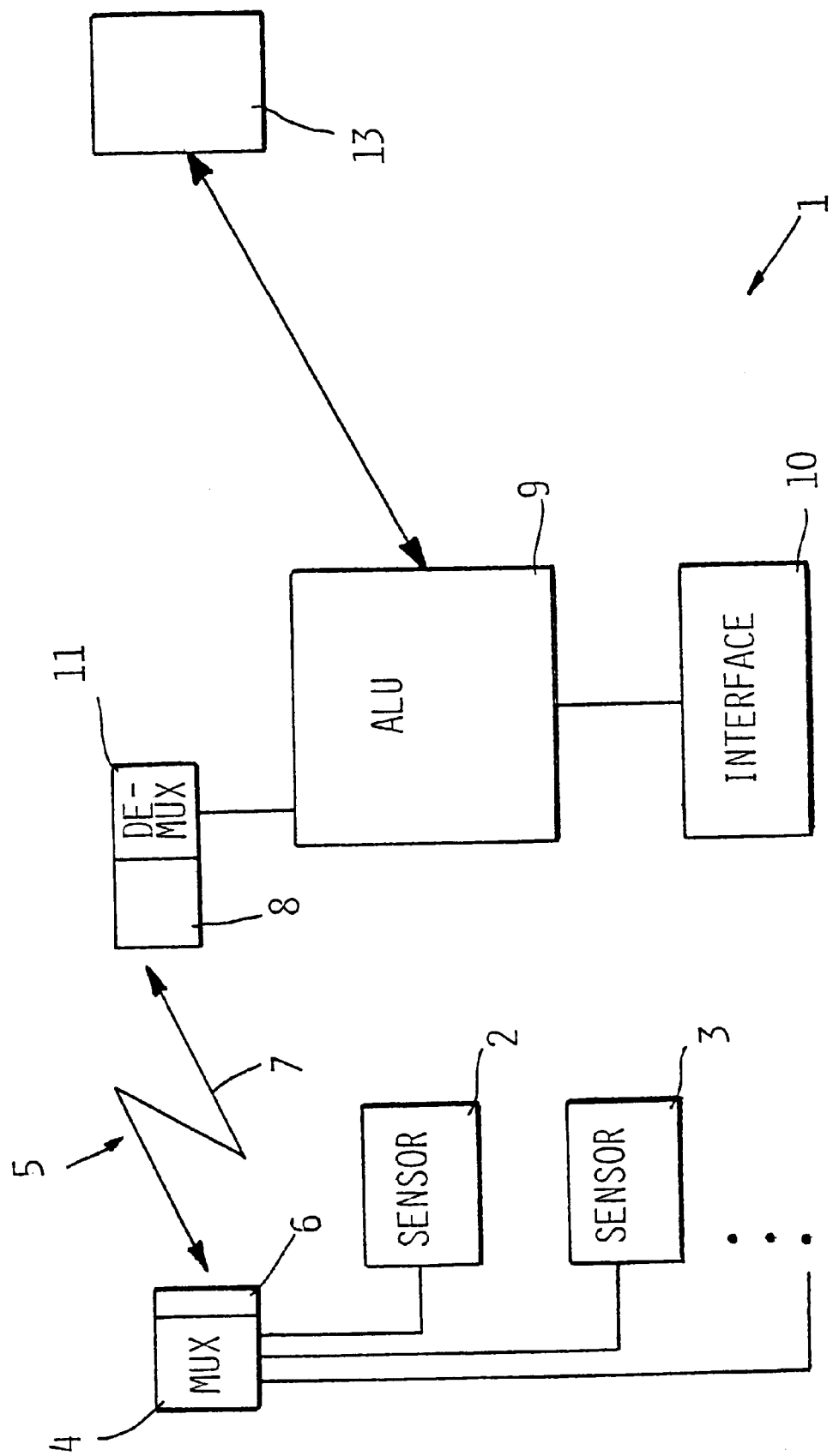

MEASURING DEVICE FOR EVALUATION OF PHYSICAL AND/OR CHEMICAL PROPERTIES OF GASES, FLUIDS AND/OR SOLID MATERIALS

BACKGROUND

The invention relates to a measuring device for the evaluation of physical and/or chemical properties of gases, fluids and/or solid materials with an arithmetic-logic unit which is connected to a sensor at a technical installation. The invention also relates to a method of evaluating physical and/or chemical properties of gases, fluids and/or solid materials, in which measurement data are passed on from a sensor at a technical installation to an arithmetic-logic unit.

A measuring device of this kind and method of this kind are generally known in the field of metrology. Measuring devices of this kind can be purchased commercially, in particular, for the analysis of fluids and/or gases.

In a measuring device of this kind, a pH value sensor, for example, is provided as the sensor which is immersed in a fluid to be analyzed. The raw data measured by the sensor are prepared by electrical circuitry for subsequent transfer to the arithmetic-logic unit as measurement data. With the aid of the arithmetic-logic unit, the measurement data can, for example, be displayed on a monitor.

In the case of larger technical installations, in particular, in the case of waste treatment plants or the like, for example, there is often a desire on the part of the plant operator not to want to be bothered further with the preparation of the measurement data provided by the sensor, but rather to have measurement data that have already been prepared. Finally, the plant operator wants to reduce his own expenses regarding the measurement data.

The object of the invention is to create a measuring device and a method for evaluating the physical and/or chemical properties of gases, fluids and/or solid materials, which entails a lowest possible expense for the plant operator.

SUMMARY

The object is achieved according to the invention by means of a measuring device in that the arithmetic-logic unit and the sensor are linked by means of a communications medium and the arithmetic-logic unit and a piece of equipment at the technical installation are linked by means of an additional communications medium. In the case of a method for evaluating the properties of gases, fluids, and/or solid materials, the object is achieved according to the invention by the measurement data being transmitted over a communications medium from the sensor to the arithmetic-logic unit, by data and/or program packages being generated by the arithmetic-logic unit from the measurement data, and by the data and/or program packages being transmitted over a further communications medium from the arithmetic-logic unit to equipment at the technical installation.

The arithmetic-logic unit is intended to process the measurement data from the sensor. The arithmetic-logic unit communicates the fully prepared measurement data in the form of the data and/or program packages to the equipment at the technical facility. In the final analysis the data is sent to the plant operator. As a result of this method, it is possible that the plant operator need not have anything to do with the preparation of the measurement data. To do this, it is only necessary that the arithmetic-logic unit on which the processing of the measurement data takes place is not run by the plant operator but, for example, by a service provider. The plant operator then receives only the completed, prepared measurement data transmitted to his equipment from this service provider, for example, and he can accept and further analyze this prepared data immediately.

It is essential in the method of proceeding according to the invention that, on the one hand, an arithmetic-logic unit is in place which is intended specifically for preparing the transmitted measurement data and, that, on the other hand, equipment is in place in the technical facility which is independent of the arithmetic-logic unit, and to which the prepared measurement data in particular are communicated by the arithmetic-logic unit. Through this separation of the arithmetic-logic unit and the equipment, it is possible that the preparation of the measurement data can be contracted out by the plant operator to an external service provider, so that the plant operator himself needs to expend no additional effort on the preparation of the measurement data.

In advantageous embodiments of the measuring device according to the invention, or the method according to the invention, the arithmetic-logic unit and the sensor are linked with one another over a radio link and/or over a telephone connection and/or over an Internet and/or Intranet connection and/or over a communications link superposed on a power grid and/or similar. The measurement data is transmitted by radio and/or by telephone and/or over the Internet and/or Intranet and/or over a power grid and/or the like.

The link between the arithmetic-logic unit and the sensor over the communications medium, or the transmission of the measurement data over the communications medium, is achieved, therefore, with the assistance of one or more of the aforementioned communication means. The aforementioned communication means have the advantage that they do not have to be created completely from nothing, but are already in place at least partially or completely. For example, transmission of the measurement data by telephone can be achieved simply by providing a modem or similar at both ends of the telephone line, with the help of which the measurement data is fed into the telephone network or is picked up from it. Modems of this kind are known and can be purchased inexpensively on the market.

The same applies to the transmission of the measurement data over the Internet or Intranet. Here it is particularly advantageous if the sensor is employed as a so-called client and the arithmetic-logic unit as a so-called server. In this way there is minimal resulting expense for the setup of the Internet connection between the sensor and the arithmetic-logic unit.

An additional advantage of the aforementioned possibilities in communications media lies in the fact that with a telephone connection, for example, or an Internet connection, any locations whatsoever can be linked with each other. This means that the measurement data can be transmitted anywhere at all. In comparison to the known, closed-circuit measuring device, this represents a substantial advantage with respect to the flexibility and utility of the present invention.

It is advantageous if the arithmetic-logic unit and the equipment are linked by a mail service and/or over a radio link and/or over a telephone connection and/or over an Internet connection and/or over an Intranet connection and/or over a communications link superposed on a power grid. The data and/or program packages are then communicated by mail and/or transmitted by radio and/or by telephone and/or over the Internet or Intranet and/or over a power grid and/or the link.

In this way, as already explained, already existing communications media are utilized for the measuring device according to the invention. This brings with it the advantage of a simple and inexpensive setup for the measuring device.

In a further advantageous embodiment of the measuring device according to the invention, several sensors are linked with the arithmetic-logic unit over a multiplexer or the like. For this, known commercial multiplexers, or demultiplexers respectively, can be used, which can be obtained as hardware products or also as a software module. With the assistance of the multiplexers, or demultiplexers, the measurement data can then be transmitted from the sensors to the arithmetic-logic unit.

It is particularly advantageous if the arithmetic-logic unit is implemented in the form of a personal computer. This means that no special arithmetic-logic unit is required, which has to be purchased at great expense. Instead, a standard commercially available personal computer can be bought and used. The program packages which are required for the analysis of the measurement data generated by the sensors, for example, can be installed on the personal computer. Similarly, program packages can be installed on the personal computer, which are suitable for generating lists of the measurement data or similar, for example.

The personal computer can be equipped, for example, very simply with a modem or the like, with which the transmission of the measurement data from the sensor(s) to the personal computer can be accomplished. The purpose of the modem can be to set up a telephone connection, but it is likewise possible to set up an Internet and/or an Intranet connection with the help of the modem.

Through the use of the personal computer, all the possibilities are opened up which are available in connection with a personal computer of this kind and are available for purchase. The measuring device according to the invention can be expanded in a simple and inexpensive way and adapted to the specific conditions of its application.

The use of the measuring device according to the invention is particularly practical in the analysis of fluid and/or gas and/or in measuring humidity in fluids and/or gases.

Additional features, potential applications and advantages of the invention will be apparent from the ensuing description of practical examples of the invention, which are shown in the drawing. All the features described or portrayed in themselves or in combined in whole or part form the subject of the invention, independently of their summary in the patent claims or the retroactive references therein and independently of their formulation or representation in the description or in the drawing.

BRIEF DESCRIPTION OF THE DRAWINGS

The only FIGURE in the drawing shows a schematic block diagram of a practical example of a measuring device according to the invention.

DETAILED DESCRIPTION

A measuring device 1 is shown in the figure which is suitable for the evaluation of physical and/or chemical properties of gases, fluids and/or solid materials. In particular, the measuring device 1 can be used for the analysis of fluids and/or gases and/or in the measurement of humidity in fluids and/or gases.

The measuring device 1 is equipped with one or more sensors, 2, 3. In the case of these sensors, they can be pressure sensors, flow sensors, liquid level sensors, pH-value sensors, turbidity sensors, temperature sensors, sensors for measuring chlorine, or chlorine dioxide content, sensors for measuring oxygen content, conductive sensors and/or humidity sensors.

The sensors 2, 3 are preferably located in a technical installation of a plant operator. It can be, for example, a waste treatment plant or similar.

The sensors 2, 3 are provided and suitable for generating the measurement data assigned to them in each instance. If required, electrical circuits are coupled to the sensors 2, 3, which are provided to convert the raw data measured directly by the sensors 2, 3 into the measurement data. The measurement data in each case is made available by the sensors 2, 3 at the outputs of the sensors 2, 3.

The measuring device 1 has a multiplexer 4, to which the sensors 2, 3 are attached. The multiplexer 4 is intended to scan the measurement data from the sensors 2, 3 in succession and to reconfigure them into a common signal.

Attached to the multiplexer 4 is a communications medium 5 which has a component 6, a transmission link 7 and a component 8. The communications medium 5 can be, for example, a radio link. In this case the component 6 is equipped with a transmitter and the component 8 with a receiver. The common signal from the multiplexer, composed of the measurement data from the sensors 2, 3, can then be transmitted over the transmission link 7 from the transmitter 6 to the receiver 8.

It is also possible that the communications medium 5 is a telephone line or an Internet connection. In this case, the components 6 and 8 each have a modem, for example, or similar. The common signal composed of the measurement data from the sensors 2, 3 and generated by the multiplexer 4, can then be transmitted over the transmission line 7 between the two modems. With a communications medium 5 of this kind practically world-wide communication is possible.

If the communications medium 5 is a telephone line, the measurement data can be transmitted continuously over a permanent telephone line, for example. If the communications medium is an Internet connection, the measurement data is converted into the corresponding digital signals, which are then transmitted over the electronic network of the Internet. While so-called raw time operation is possible in the case of a telephone link, this is not always possible quite so easily with an Internet connection.

Similarly, it is possible that a communications link is set up over an existing power grid as the communications medium 5. In this case, the signals to be transmitted are converted into high-frequency signals by the components 6 or 8, respectively, which are superposed on the existing power grid. With a communications medium 5 of this type, it is possible to transmit the measurement data within the existing power grid.

The measuring device 1 has an arithmetic-logic unit 9, specifically a personal computer. The arithmetic-logic 9 is equipped with an interface 10, specifically with a monitor and a keyboard. A demultiplexer 11, which is assigned to the component 8, is attached to the arithmetic-logic unit 9.

The arithmetic-logic unit 9 is preferably located at a service provider. The arithmetic-logic unit 9 is consequently not a permanent part of the technical facility and is therefore not assigned to the plant operator. The signals received by the component 8 are decoded again by the demultiplexer 11 and converted into the measurement data from the sensors 2, 3. In this way the measurement data from the sensors 2, 3 is again available in the arithmetic-logic unit 9. The measurement data from the sensors 2, 3 can be processed by the arithmetic-logic unit 9 in any way whatsoever.

The multiplexer 4, as well as the demultiplexer 11, can be in place in the form of hardware components as well as in the form of software modules. It is similarly possible that the multiplexer 4 and the demultiplexer 11 are suitable for carrying out a transmission in the opposite direction, that is to say, from the arithmetic-logic unit 9 to the sensors 2, 3.

The component 8 can be configured as a plug-in board for the arithmetic-logic unit 9, specifically for the personal computer. In particular with a telephone line or an Internet connection, the component 8 can be a plug-in modem.

In the case of the multiplexer 4 and the component 6, it can be a process-controlled transmitting unit, which consists where necessary of a personal computer with a plugged-in modem.

It is clear that in the event of there being only a single sensor 2,3, a multiplexer 4 or demultiplexer 11, respectively, does not have to be in place. In this case, the single sensor 2,3 is connected directly to the arithmetic-logic unit 9 over the communications medium 5. It is similarly possible that several sensors 2, 3 are connected over the communications medium 5 with the arithmetic-logic unit 9 without a multiplexer 4 or demultiplexer 11.

It is particularly advantageous if the sensors 2, 3 function as so-called clients and the arithmetic-logic unit 9 functions as a so-called server, and if a connection over the Internet or Intranet is set up between the clients and the server. One way of implementing this, for example, is for the server to possess an Internet domain address, and for the clients to have neither an Internet domain address nor an e-mail address, but both the server and the clients being capable of communicating over the Internet.

Under these conditions, it is possible that one of the clients checks in at predetermined intervals over the Internet with the server. To do this, the client, in the same way as a normal Internet personal or home computer, sets up a link with the server. The client dials into the Internet, for example, over a telephone line and establishes a connection with the Internet domain address of the server.

Then the client communicates the measurement data that it has generated over the existing Internet connection to the Internet domain address of the server, and thus to the server. The measurement data communicated over the Internet by the client to the server are received by the server and processed. Specifically, the measurement data are prepared through the server and, where necessary, is archived.

As long as the Internet connection between the client and the server is in place, it is similarly possible for the server to communicate information to the client. This information can concern, for example, new time intervals at which the transmission of the measurement data is to take place afterwards. Similarly, it can concern the request to the client to complete specific test routines and to transmit the test result to the server. The information communicated over the Internet from the server to the client is received by the client and processed accordingly.

Of course, the previously described Internet connection between the server and one of the clients can also be set up between the server and several clients. In this case, the data to be transmitted are processed with the help of the multiplexer 4 and the demultiplexer 11. It is similarly apparent that the client can also be equipped with an Internet domain address, so that it can also be called by the arithmetic-logic unit 9. This applies in the same way also to several sensors 2, 3, which can then be provided individually or jointly with Internet domain addresses.

The arithmetic-logic unit 9 is linked over an additional communications medium 12 with equipment 13 at the technical installation at which the sensors 2, 3 are located. This ultimately connects the arithmetic-logic unit 9 over the communications medium 12 with the plant operator at the technical installation.

In the case of the communications medium 12, in its simplest form it can be a mail service. It is similarly possible that it is a telephone line, an Internet and/or Intranet connection, a communications link over a power grid or similar. The plant operator's equipment 13 is adapted to the specific configuration of the communications medium 12.

With the assistance of the communications medium 12, data packages and/or program packages can be sent by mail and/or by radio and/or by telephone and/or over the Internet and/or Intranet and/or over the power grid from the arithmetic-logic unit 9 to the plant operator's equipment 13, or in the opposite direction. In the case of the data packages or program packages, the packages can be finished measurement data, for example, lists of measurement data or the like, as well as maintenance reminders or warnings. Conversely, the packages can be communications which are uploaded by the plant operator into the arithmetic-logic unit 9, and which are ultimately intended for the service provider.

If the communications medium 12 in question is a telephone line and/or an Internet connection, the modems can be inserted into the arithmetic-logic unit 9 and into the equipment 13 as plug-in boards.

When the measuring device described 1 is in operation, the measurement data generated by the sensors 2, 3 is transmitted to the arithmetic-logic unit 9 over the communications medium 5. There the measurement data is prepared or reprocessed. This preparation and reprocessing in the arithmetic-logic unit 9 is carried out by the service company, to which the arithmetic-logic unit 9 is assigned. This service company performs the entire processing of the measurement data obtained from the plant operator's sensors 2, 3 for the plant operator.

Data packages and/or program packages generated by the arithmetic-logic unit 9 are then transmitted over the communications medium 12 to the plant operator's equipment 13. The plant operator now has available to him all of the measurement data from the sensors 2, 3 in finished form. The plant operator can then further process these measurement data without delay, for example, in a closed loop operation at its technical installation where the sensors 2, 3 are located.

It is similarly possible that even this closed loop operation in the plant operator's technical installation is performed by the service company, based on the measurement data obtained. In this case, the plant operator ultimately obtains only lists or the like over the communications medium 12, on which the service company reports on the operation of the technical installation.

What is claimed is:

1. A measuring device to evaluate physical and/or chemical properties of gases, fluids and/or solid materials comprising:
    an arithmetic-logic unit and a sensor, the arithmetic-logic unit and the sensor connected to each other over a communications medium and the sensor adapted to send measurement data to the arithmetic-logic unit; and
    the arithmetic-logic unit and use equipment in a use installation connected to each other over another communications medium, wherein the arithmetic-logic unit is remote from the use installation and the sensor is at the use installation.

2. The measuring device in accordance with claim 1, wherein the communications medium connecting the arithmetic-logic unit and the sensor is one of a radio link, a telephone line, an Internet connection, an Intranet connection, and a communications link superposed on an energy grid.

3. The measuring device in accordance with claim 1, wherein the another communications medium connection connecting the arithmetic-logic unit and the equipment is one of a mail service, a radio link, a telephone line, an Internet connection, an Intranet connection, a communications link superposed on an energy grid and other similar means of communication.

4. The measuring device in accordance with claim 1, wherein several sensors are connected by means of a multiplexer with the arithmetic-logic unit.

5. The measuring device in accordance claim 1, wherein the arithmetic-logic unit is implemented as a personal computer.

6. The measuring device in accordance with claim 1, wherein the measuring device is adapted to analyze one of fluids, gases, and the measurement of humidity in fluids and gases.

7. The measuring device in accordance with claim 1, wherein the sensor is one of a pressure sensor, a flow sensor, a fill level sensor, a pH-value sensor, a turbidity sensor, a temperature sensor to measure one of chlorine and chlorine dioxide, a sensor to measure oxygen content, a conductivity sensor, and a humidity sensor.

8. A method to evaluate physical and/or chemical properties of gases, fluids and/or solid materials comprising the steps of:

transmitting measurement data from sensors to an arithmetic-logic unit over a communications medium, the sensors located at a use installation and the arithmetic-logic unit located remotely from the use installation;

generating data packages by the arithmetic-logic unit from the measurement data; and transmitting data packages over an additional communications medium from the arithmetic-logic unit to use equipment at the use installation.

9. The method in accordance with claim 8, wherein the step of transmitting the measurement data comprises the step of:

transmitting the measurement data by one of a radio, a telephone, over the Internet, over an Intranet, and over an energy grid.

10. The method in accordance with claim 8, wherein the step of transmitting the data packages comprises the steps of:

transmitting the data packages by one of mail, radio, telephone, over the Internet, over an Intranet, and over a power grid.

11. The method in accordance with claim 8, wherein the arithmetic-logic unit is not operated by an operator of the use installation.

12. The method in accordance with claim 11, comprising:

operating the arithmetic-logic unit by a service provider.

13. The method according to claim 8, further comprising:

transmitting the measurement data from the sensors to a multiplexer at the use installation prior to transmitting the measurement data to the arithmetic-logic unit.

14. The method according to claim 8 wherein the data packages include commands for use equipment at the use installation.

15. In a measuring device to evaluate at least one of a physical and chemical property of a material at an installation using a sensor, the material being at least one of a gas, a fluid and a solid, the improvement comprising:

an arithmetic-logic unit located remote from the installation and receiving raw measurement data from the sensor through a first communications means, the arithmetic-logic unit operable to process the raw measurement data and send processed data to the installation.

16. The improvement according to claim 15 further comprising:

a second communications means operable to receive the processed data from the arithmetic-logic unit and send the processed data from the arithmetic-logic unit to equipment at the installation.

17. The improvement according to claim 16 wherein the first communications means is one of a radio link, a telephone line, an Internet connection, an Intranet connection, and a communications link superposed on an energy grid, and wherein the second communications means is one of a mail service, a radio link, a telephone line, an Internet connection, an Intranet connection and a communications link superposed on an energy grid.

18. The improvement according to claim 16, further comprising:

a multiplexer at the installation receiving raw measurement data from several sensors at the installation, the arithmetic-logic unit receiving the raw measurement data as a multiplexed signal.

19. The improvement according to claim 15, further comprising:

a multiplexer at the installation receiving raw measurement data from several sensors at the installation, the arithmetic-logic unit receiving the raw measurement data as a multiplexed signal.

20. The improvement according to claim 13 wherein the processed data includes commands for equipment at the installation.

* * * * *